(12) United States Patent
Hirshberg

(10) Patent No.: US 7,646,378 B2
(45) Date of Patent: Jan. 12, 2010

(54) SYSTEM AND METHOD FOR USER INTERFACE

(76) Inventor: David Hirshberg, 14n Hasachlav Street, Haifa, 34790 (IL)

( * ) Notice: Subject to any disclaimer, the term of this patent is extended or adjusted under 35 U.S.C. 154(b) by 686 days.

(21) Appl. No.: 11/216,021

(22) Filed: Sep. 1, 2005

(65) Prior Publication Data

US 2007/0046633 A1    Mar. 1, 2007

(51) Int. Cl.
  *G09G 5/00* (2006.01)
(52) U.S. Cl. ......................... 345/173; 345/169
(58) Field of Classification Search ................. 345/173, 345/156, 168, 169; 178/18.01
  See application file for complete search history.

(56) References Cited

U.S. PATENT DOCUMENTS

| | | | | |
|---|---|---|---|---|
| 5,666,113 | A * | 9/1997 | Logan | 341/34 |
| 6,492,978 | B1 * | 12/2002 | Selig et al. | 345/173 |
| 6,597,345 | B2 | 7/2003 | Hirshberg | |
| 6,704,005 | B2 * | 3/2004 | Kato et al. | 345/173 |
| 7,046,230 | B2 * | 5/2006 | Zadesky et al. | 345/156 |
| 2001/0011995 | A1 * | 8/2001 | Hinckley et al. | 345/156 |
| 2005/0259072 | A1 * | 11/2005 | Sato | 345/156 |
| 2006/0033720 | A1 * | 2/2006 | Robbins et al. | 345/173 |

OTHER PUBLICATIONS

Said B. Nesbat, "A System for Fast, Full-Text Entry for Small Electronic Devices", Proceedings of the Fifth International Conference on Multimodel Interfaces, ICMI 2003 (ACM-sponsored), Vancouver, Nov. 5-7, 2003.

* cited by examiner

*Primary Examiner*—Amr Awad
*Assistant Examiner*—Stephen G Sherman
(74) *Attorney, Agent, or Firm*—Pearl Cohen Zedek Latzer, LLP

(57) ABSTRACT

A user interface apparatus for an electronic device. The apparatus comprises: one or more mechanical keys; one or more touch sensitive surfaces, the mechanical keys being adjacent to the touch sensitive surfaces; and a processor for receiving one or more user input operations performed on the mechanical keys and the touch sensitive surfaces, the input operation comprising a combined operation combining touching the touch sensitive surface with pressing at least one mechanical key, in a single stroke.

26 Claims, 5 Drawing Sheets

SYSTEM AND METHOD FOR USER INTERFACE

BACKGROUND OF INVENTION

Electronic devices are commonplace in our life today. They are located in our homes and offices, like PCs, and carried with us, like cellular phones. The need for a simple, intuitive and with rich functionality input methods for user interface is increasing with time. Input method in the computer environment had evolved from using simple mechanical push button keys like in a standard keyboard, to using a pointing device like mouse, track balls and many kinds of touch sensitive pads. In the PDA device environment, a touch screen with a stylus input method is very popular, while in the cellular phone environment, simple numeric keypad with a small number of additional keys and a tiny joystick is commonplace today. Touch sensitive surface, due to technology enhancement, decreased prices and its flexibility, become increasingly popular mean of user input apparatus in electronic devices. However, touch sensitive surfaces are still inferior to mechanical keys in operational feedback provided to the user. Although many devices have both mechanical keys and touch sensitive surfaces, currently those devices do not implement input methods that combine those apparatus to form a natural input method that take the advantages from both. The following invention offers several way of combining mechanical keys and touch sensitive surface together to form a family of new input methods that combine the best features of each type.

SUMMARY OF THE INVENTION

There is thus provided, in accordance with some preferred embodiments of the present invention, a user interface apparatus for an electronic device, the apparatus comprising:
  one or more mechanical keys;
  one or more touch sensitive surfaces, said one or more mechanical keys being adjacent to said one or more touch sensitive surfaces;
  processor for receiving one or more user input operations performed on said at least one or more mechanical keys and said one or more touch sensitive surfaces, the input operation comprising a combined operation combining touching that comprises touching or moving over the touch sensitive surface with pressing that comprises activation of at least one mechanical key, in a single stroke.

Furthermore, in accordance with some preferred embodiments of the present invention, said one or more mechanical keys comprises one or more push buttons.

Furthermore, in accordance with some preferred embodiments of the present invention, said one or more mechanical keys and said one or more touch sensitive surfaces at least partially overlap.

Furthermore, in accordance with some preferred embodiments of the present invention, said one or more touch sensitive surfaces are made from flexible materials and at least partially covers the said one or more mechanical keys.

Furthermore, in accordance with some preferred embodiments of the present invention, faces of said one or more keys are portions of said one or more touch sensitive surfaces.

Furthermore, in accordance with some preferred embodiments of the present invention, said one or more touch sensitive surfaces are located peripherally to said one or more mechanical keys.

Furthermore, in accordance with some preferred embodiments of the present invention, some of said one or more touch sensitive surfaces are located adjacent a portion of periphery of said one or more mechanical keys.

Furthermore, in accordance with some preferred embodiments of the present invention, the electronic device comprises a pointing device.

Furthermore, in accordance with some preferred embodiments of the present invention, said one or more mechanical keys comprises a rolling wheel.

Furthermore, in accordance with some preferred embodiments of the present invention, said one or more mechanical keys comprises a tracking ball.

Furthermore, in accordance with some preferred embodiments of the present invention, the electronic device is a game pad.

Furthermore, in accordance with some preferred embodiments of the present invention, the electronic device is a cellular phone.

Furthermore, in accordance with some preferred embodiments of the present invention, said one or more mechanical keys are arranged around said one or more touch sensitive surfaces.

Furthermore, in accordance with some preferred embodiments of the present invention, the processor is made to recognize an input operation that is performed by touching followed by pressing.

Furthermore, in accordance with some preferred embodiments of the present invention, the processor is made to recognize an input operation that is performed by pressing followed by touching.

There is thus provided, in accordance with some preferred embodiments of the present invention, a method for inputting information into an electronic device using a user interface apparatus, the method comprising:
  providing a user interface apparatus comprising:
    one or more mechanical keys;
    one or more touch sensitive surfaces, said one or more mechanical keys being adjacent to said one or more touch sensitive surfaces;
    processor for receiving one or more user input operations performed on said at least one or more mechanical keys and said one or more touch sensitive surfaces,
  inputting an input operation by a combined operation combining touching that comprises touching or moving over the touch sensitive surface with pressing that comprises activation of at least one mechanical key, in a single stroke.

Furthermore, in accordance with some preferred embodiments of the present invention, inputting of the input operation is performed by touching followed by pressing.

Furthermore, in accordance with some preferred embodiments of the present invention, inputting of the input operation is performed by pressing followed by touching.

Furthermore, in accordance with some preferred embodiments of the present invention, the single stroke comprises sliding over said one or more touch sensitive surfaces towards a mechanical key and then pressing the mechanical key.

Furthermore, in accordance with some preferred embodiments of the present invention, the sliding is carried out in more than one direction.

Furthermore, in accordance with some preferred embodiments of the present invention, the touching comprises movement over said one or more touch sensitive surfaces in more than one direction.

Furthermore, in accordance with some preferred embodiments of the present invention, inputting of the input operation comprises sliding over one touch sensitive surface towards one of said one or more mechanical keys, which surround the touch sensitive surface.

BRIEF DESCRIPTION OF THE DRAWINGS

The invention is herein described, by way of example only, with reference to the accompanying drawing, wherein.

DESCRIPTION OF PREFERRED EMBODIMENTS

The present invention is a user interface for electronic device, comprising an arrangement of one or more touch sensitive surfaces and one or more mechanical keys. By "mechanical key" is meant, for the purpose of the present invention a key that comprises a mechanical mechanism that is operated by pressing, pushing, sliding, rolling, rotating, or by any other physical movement.

The touch sensitive surface and the mechanical keys are provided adjacently, so that there is either physical contact between them or that they are in close proximity with each other. Overlapping between the mechanical key and the touch sensitive surface is also covered by the term "adjacently". This arrangement allows a user to enter input operations in a combined activation. The combined operation comprises combining contact or motion over the touch sensitive surface (hereinafter—touching) with activation of at least one mechanical key (hereinafter—pressing), in a single stroke. The order of activation may vary, so that the combined operation may comprise touching followed by pressing, or pressing followed by touching (or even simultaneous—or substantially simultaneous—touching and pressing).

"Input operations" in the context of the present invention comprise commands, characters, symbols, functions and any other input information.

"Single stroke" in the context of the present invention comprises a single continuous movement. This may be in the form of a movement across at least a portion of a touch sensitive surface over to one or more mechanical key, movement over a mechanical key over to the touch sensitive surface, or simultaneous contact with the touch sensitive surface and at least one mechanical key. A continuous movement may be in one or more directions.

The operation of the user interface apparatus, according to the present invention, may be performed by a finger, by a stylus or by any other similar objects.

Figure 1:
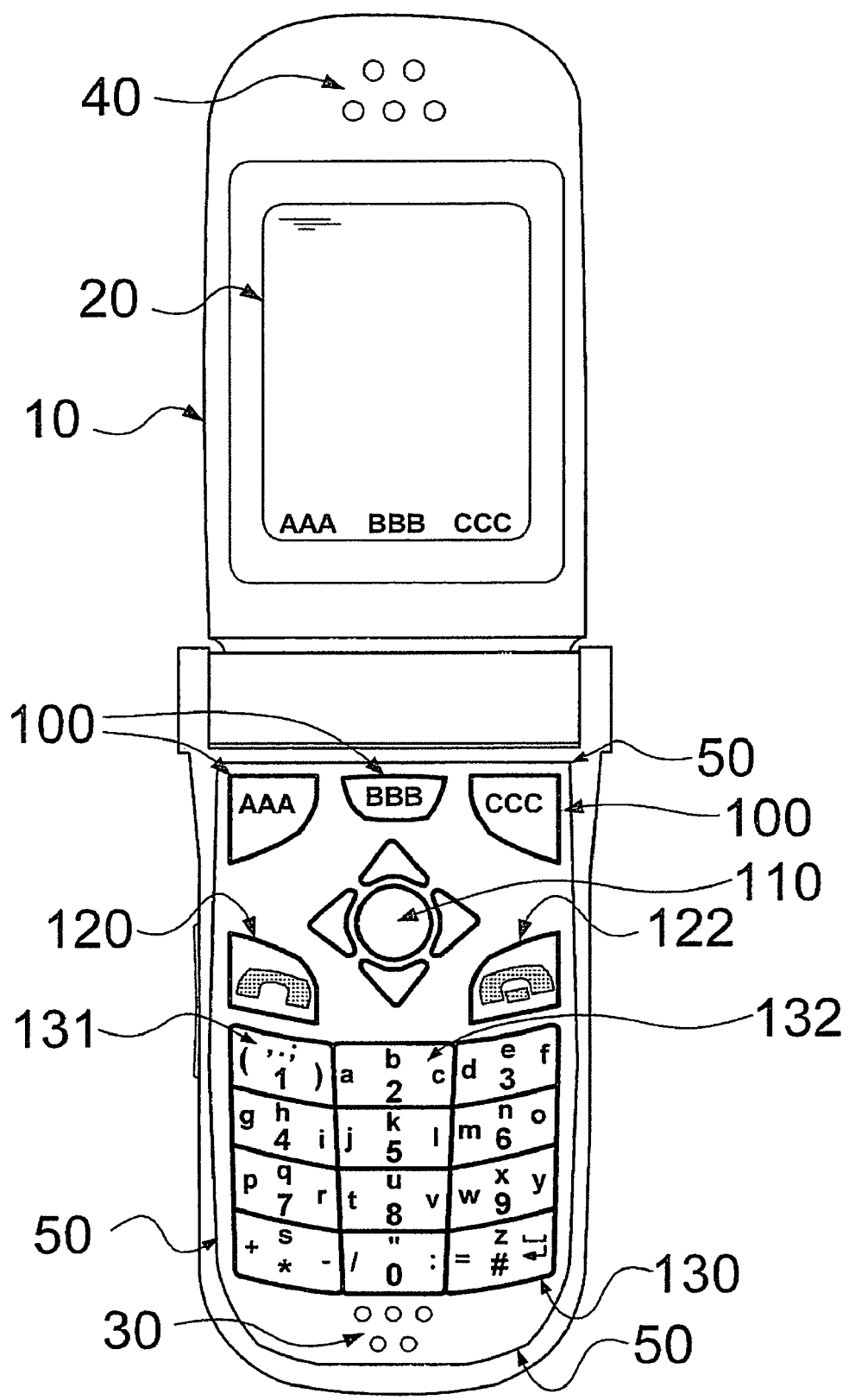
FIG. 1 is a front view of a shell style cell-phone contains the preferred embodiment of the invention.

A preferred embodiment according to the present invention is implemented in a typical cellular phone illustrated in FIG. 1. This cellular phone includes a shell style case 10, a display 20, a speaker and a microphone, 30 and 40 respectively, and several push button keys including: three menu selection keys 100, five navigation & selection keys 110, call answer key 120, call end key 122 and a twelve key numeric keypad 130. In addition, the cell phone includes a touch sensitive surface on its lower inner face. The touch sensitive surface area is designated by its boundary 50. The touch sensitive surface includes both the surface of the non-movable case as well as the surface of the keys inside the touch sensitive area 50. The touch sensitive surface is implemented as a flexible sheet, contains of touch sensor grid (capacitive, resistive or any other sensing technology), spread under the touch sensitive area 50. A processor reads the sensors state and determines if a finger, stylus or any other organ or object operated by the user is touching the touch sensitive area 50. If a touch is detected the location of the touch on the surface is read as well. While the use of mechanical keys and touch sensitive surfaces are well known prior art, the current invention involved in combining those two input methods to act together as a new simple, convenient, diversified and powerful input method for the device.

The invention covers two types of operations:
(1) Operation that starts with "press" activation on a mechanical key and finishes with "touch" activation on a touch sensitive surface.
(2) Operation that starts with a "touch" operation on the touch sensitive surface and finishes with "press" activation of a mechanical key.

The invention is used for improved text typing method on the cellular phone. Taking, for example, the text entry method disclosed in U.S. Pat. No. 6,597,345 to Hirshberg, 22 Jul. 2003. Activating the letter 'a', according to this invention, combined with the above referenced patent method, is done be sliding the finger over the touch sensitive surface 50 towards the key of the number '2' 132 from the left side of the key, and while the finger is over the key 132, preferably in proximity to its center, a press operation on the key completes the letter 'a' typing. The device processor gets the user actions performed both on the mechanical key and on the touch sensitive surface and determines the user intention, in the above example, typing the letter 'a'. In a similar manner, activating 'b' and 'c' is done by sliding the finger from the upper and the right side respectively and the other letters by similar operation involving the other keys of the numeric keypad 130.

In different embodiment of the invention, typing a letter can be done using the reverse sequence. Operation in this case, starts by pressing the key of the number '2' 132, then while releasing the key, the user finger continues touching the key surface and slides the finger over the touch sensitive surface 50 towards the left side of the key 132. When the user lifts its finger from the touch surface, the device processor considers both the mechanical key and the touch sensitive surface inputs to interpret the user command, i.e. in this case, typing the letter 'a'.

Using the combination of touch sensitive surfaces and mechanical keys open an enormous choices of natural simple user interface types:
1. Differentiate input operation type using touch sensitive surface 50 trace length. For example, letter capitalization. In this case, the capitalization of a letter is selected by longer trace on the touch sensitive surface 50 than the small letters trace.
2. Differentiate input operation type using touch sensitive surface 50 trace direction. For example, user can type opening parenthesis, comma, dot, semicolon, closing parenthesis by a trace coming from left, upper left, up, upper right, right side of key 131 respectively.
3. Differentiate operation type using touch sensitive surface 50 trace pattern. For example, for capitalization of the letter 'f' according to proposal in the above paragraph 1, a long trace need to be done to the right side of key 132, however the touch sensitive surface 50 boundary is too close to key 132, so long trace to the right could not be detected in this area. To overcome this, a straight long trace is replaced with a trace that is curved upwards when it reaches near the touch sensitive surface 50 boundary. Another example, is adding accents to the Latin letter by combining a graphic resembles gestures during the touch part of the activation.

The combination of the touch sensitive surface with the mechanical keys of the numeric keypad can be useful for many other text entry techniques presented on the last two decades. For example, MessagEase keyboard disclosed in the paper "A System for Fast, Full-Text Entry for Small Electronic Devices" by Saied B. Nesbat, published in the Proceedings of the Fifth International Conference on Multimodal Interfaces, ICMI 2003 (ACM-sponsored), Vancouver, Nov. 5-7, 2003. The same technique of selection by stroke direction can replace the extra key press, originally suggested in the above paper.

Another example for an application of the present invention on a cellular phone is the use of the touch trace in conjunction with the answer call key 120. One known problem in cellular communication concerns answering a call when you are unable to talk, for example when you are in a meeting and need to go out of the room to answer the call. This invention can be used to extend the functionality of the answer call key 120. The extended functionality provides variety of automated answers according to the user trace (the touch operation) precede the press of the answer call key 120. One possible implementation is the following answering rule based on the proximity of the origin of the trace relative to the numeric keypad keys:

- '1'/'4'/'7'—Automatic answer with the message "I will be with you in a moment, please wait for (30 second/1 minute/2 minute)", keeps the call active so that the user can get out the room and answer the call.
- '2'/'5'/'8'/'0'—Automatic answer with the message "Hi, I can not answer right now, I will call you back in 5/10/20/30 minutes", then hang-up the call automatically.
- '3'/'6'/'9'/'#'—Automatic answer with the message "Hi, I can not answer right now, Please call me in 5/10/20/30 minutes", then hang-up the call automatically.

Figure 2:
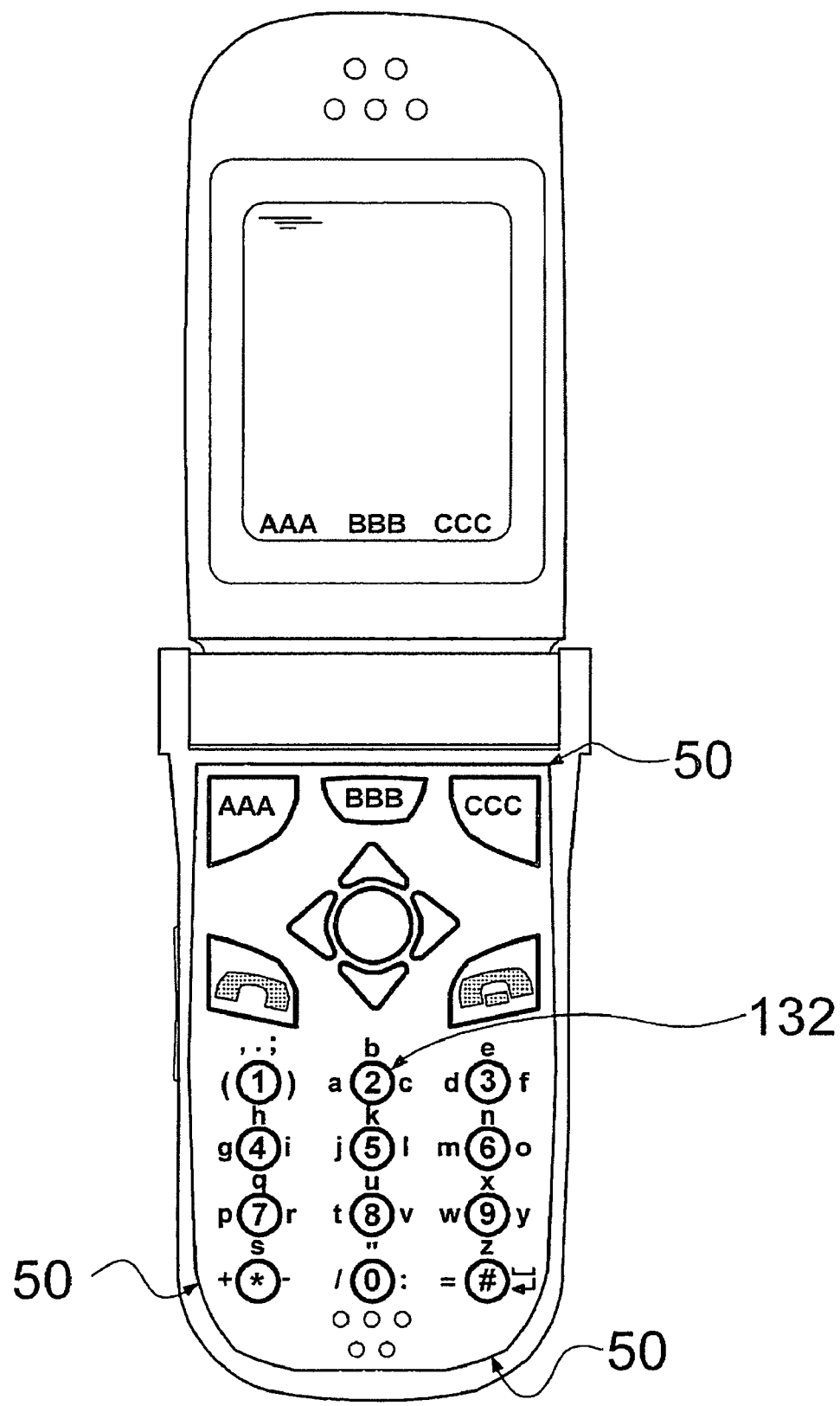
FIG. 2 is another front view of a shell style cell-phone contains alternate embodiment of the invention.

Reference now is to FIG. 2, which shows similar cellular phone. However, in this embodiment the keys faces are not part of the touch sensitive surface 50. As shown in the figure, the gap between adjacent keys is wide enough to enable sensing the finger movement before or after the key press operation. The user interface functionality in this embodiment is the same as described above. Specifically taking for example, the number '2' key 132, if the user touches the touch sensitive surface 50 in the area left to the key 132 just before the key press, the letter 'a' will be typed. All types of activation methods described above, for the cellular phone embodiment of FIG. 1, can be implemented on the cellular phone of FIG. 2 as well.

The embodiment of FIG. 1 is preferred from both user comfort (especially key size) as well as simpler and more accurate activation type detection processing. However, the implementation of the embodiment of FIG. 1, with a touch sensitive surface in the face of each key, is more complex to design and more expansive to manufacture. One way to overcome this problem, is to design a flexible touch sensing surface located over and covers the mechanical keys faces, so the user can activate the keys under the touch sensing surface.

Figure 3:
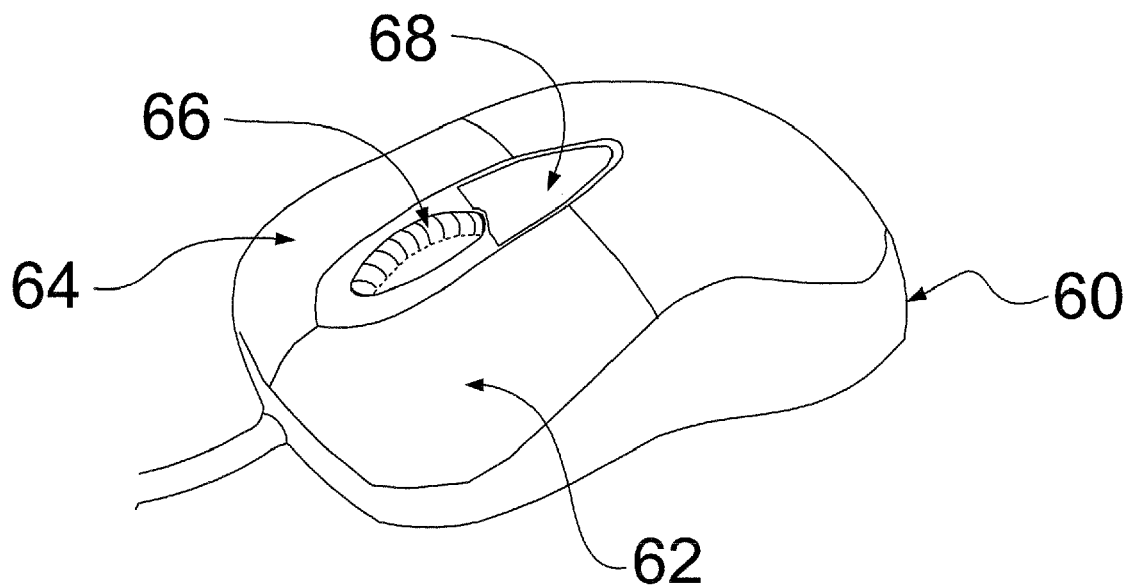
FIG. 3 is an isometric view of a computer mouse device contains an embodiment of the invention.

Reference is now made to FIG. 3. FIG. 3 presents a mouse pointing device 60 according to a preferred embodiment of the present invention, including the standard left and right click buttons, 62 & 64 respectively, and a scroll wheel 66. In addition, this mouse contains new touch sensitive surface 68 located to the side of the scroll wheel 66. The scroll wheel 66 is used to scroll the computer screen up and down depending on the rolling direction of the wheel. However, long scroll operation can be tedious and need many successive rolling operations that keep the finger performing sequences of touch, roll, de-touch and movement operation. Instead, in the current invention, when the user long for continuous scroll he just start rolling the scroll wheel 66 and when the finger reaches the wheel junction with the touch sensitive surface 68 the finger continues to touching the surface 68. This operation will cause a continuous scrolling as long as the user touch the surface 68. Moreover, the user can slide the finger over the surface away from the scrolling wheel 66 to increase the speed of rolling and back to the direction of the scrolling wheel 66 to decrease the scrolling speed.

Figure 4:
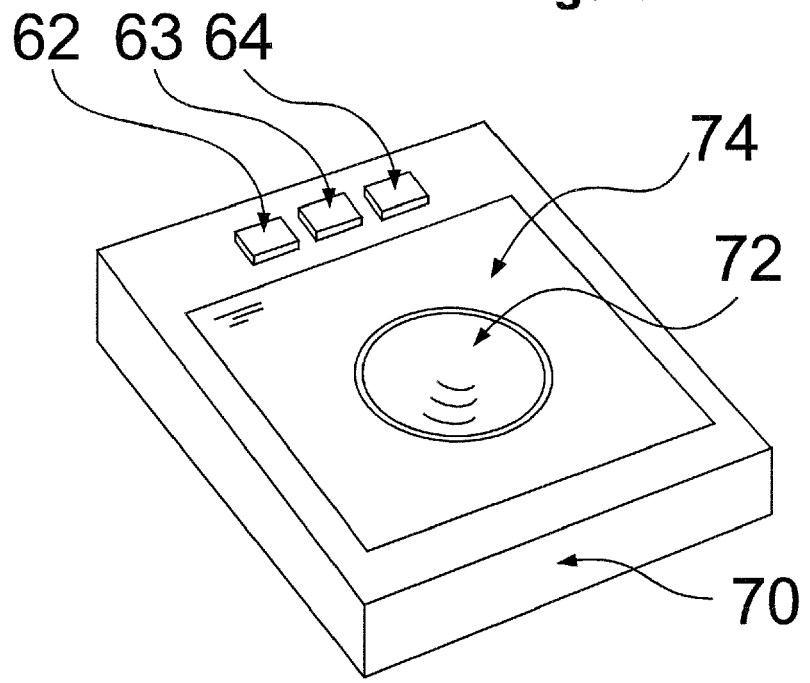
FIG. 4 is an isometric view of a track ball device contains an embodiment of the invention.

A preferred embodiment of the present invention that extends this principle is described in FIG. 4. FIG. 4 describes a track ball pointing device 70 including left, middle and right click buttons, 62, 63 & 64 respectively, and a track ball 72. In addition, this track ball contains new touch sensitive surface 74 surrounding the track ball 72. The user rolls the track ball to change the curser position on the computer display. Moving the curser from one side of the screen to the other side, can involve many rolling operations. As an alternative in the current invention, when the user wishes to continue the movement, when its finger reaches the boundary of the touch sensitive surface 74, it can continue with the curser movement by touching the surface 74. To increase the speed of movement the user can slide its finger outwards. Movement of the finger back to the center (towards the track ball 72) reduces the mouse speed. Changing the angular position of the finger, while sliding on the touch sensitive surface 74, changes the direction of the mouse movement.

Figure 5:
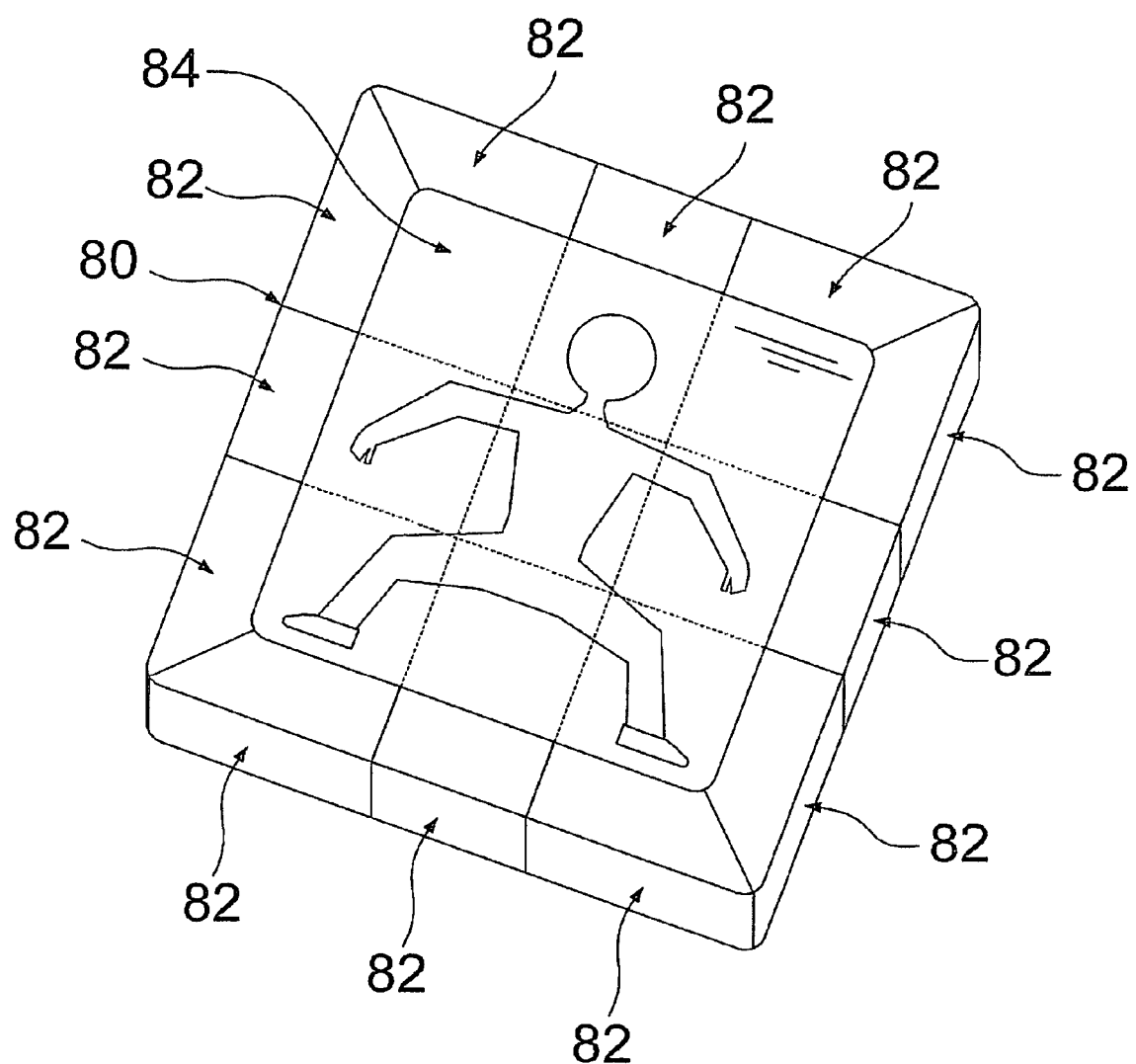
FIG. 5 is an isometric view of a game pad device contains an embodiment of the invention.
Figure 6:
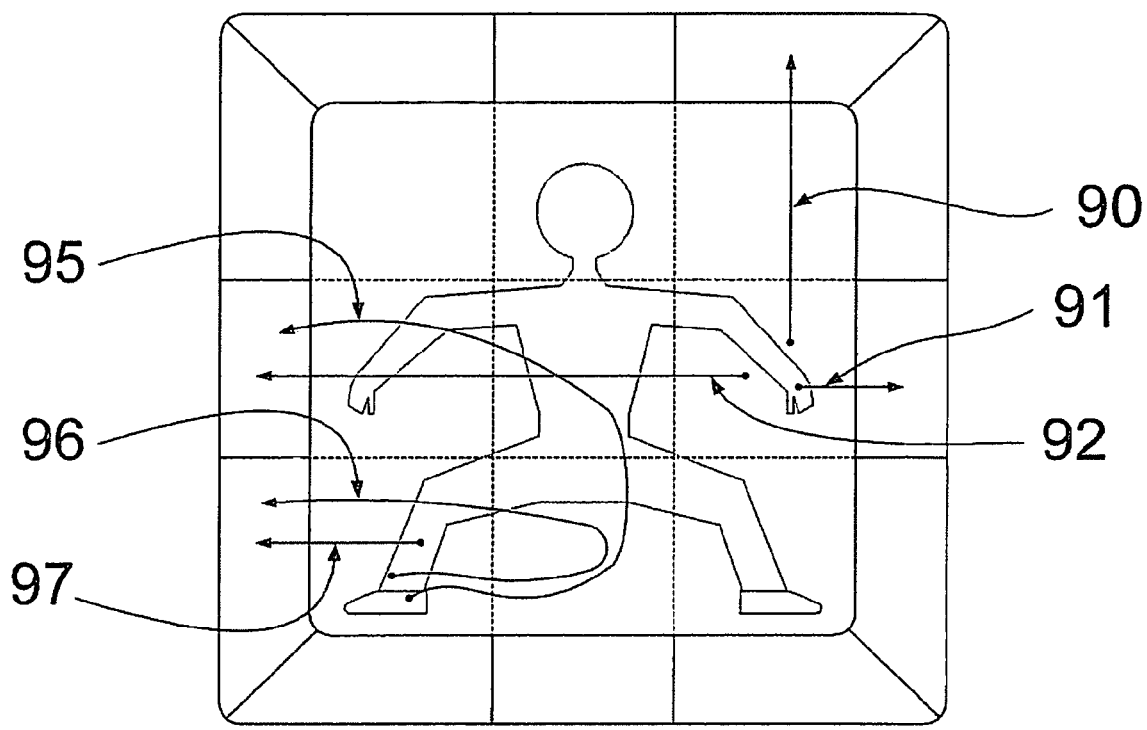
FIG. 6 is front view of the game pad of FIG. 5 showing several activation patterns that can be performed on the game pad device.

Reference is made now to FIG. 5. In this figure, a game pad device 80 is shown. The game pad includes twelve keys 82, located at the rectangle boundary of the device and a rectangle touch sensitive surface 84, in the middle of the device. The keys' face are constructed in a way that they are elevated from the touch sensitive surface 84 and can be activated by pressing the key from the touch sensitive surface 84 outwards. Keys 82 can be either a simple push button keys or a slider keys that can sense several states or a continuum of activation positions. In the current embodiment, the apparatus includes a print over the touch sensitive surface 84. The said print includes an image of a person, as well as four dashed-lines that emphasize nine distinct rectangular zones on the touch-sensitive surface 84. User can use this apparatus to input variety of instructions to the computer or the game console by drawing a pattern on the touch sensitive surface 84 finished with an activation of one of the keys 82. FIG. 6 shows small samples of such instructions to a fighting game. Finger traces 90 91 and 92 demonstrate activation of the fighter strokes with the right hand and finger traces 95 96 and 97 demonstrate activation of fighter strokes with the left foot. Finger trace 90 starts by touching the touch sensitive surface on the zone of the right hand and sliding it upwards until it activates the upper-right key. This activation is interpreted by the processor or the game console as a fighter stroke with the right hand and upward direction towards the opponent. In the same way finger traces 91 and 92 representing a right hand stroke with right and left direction towards the opponent respectively. In the same way, if the user performs finger traces 97 it will activate a left foot stroke with left direction towards the opponent. Finger trace 96 demonstrates a more complex activation available to the user. In this case, the fighter makes a rotating kick with its left foot towards the lower side of the opponent, while with finger trace 97 the rotating kick is directed to the stomach of the opponent. One can realize that the full list of fighting actions given to the user in this game pad device can be very large. If the keys 82 contain more then on/off activation states, the strength of the stroke or the kick can be controlled by the user using the strength of activation of the mechanical keys.

While the embodiments described herein with reference to the accompanying figures deal with a combination of mechanical keys and a single touch sensitive surface it is maintained that providing a combination of mechanical keys with more than one touch sensitive surface is a straight forward extension of the embodiments described and is definitely covered by the scope of the present invention.

It will be appreciated by persons skilled in the art that the present invention is not limited to what has been particularly shown and described hereinabove rather, the scope of the present invention includes many combination and sub-combination of various mechanical key and touch screen type of operation and various methods to interpret those user activities to device functions and operations. The present invention includes as well variation and modification thereof that are not in prior art, which would occur to persons skilled in the art upon reading the foregoing description.

I claim:

1. A user interface apparatus for an electronic device, the apparatus comprising:
   one or more mechanical keys;
   one or more touch sensitive surfaces, said one or more mechanical keys being adjacent to said one or more touch sensitive surfaces; and
   a processor for receiving one or more user input operations performed on said at least one or more mechanical keys and said one or more touch sensitive surfaces to achieve a single user interface function, the user input operation comprising a combined operation that determines the single user interface function combining moving over the touch sensitive surface with pressing that comprises activation of at least one mechanical key, in a single stroke, wherein said single user interface function is determined by said processor at the end of said single stroke from a plurality of valid possibilities of said user interface functions, the determination being based on specific features from both said moving and said pressing input operations performed by the user.

2. The apparatus of claim 1, wherein said one or more mechanical keys comprises one or more push buttons.

3. The apparatus of claim 1, wherein said one or more mechanical keys and said one or more touch sensitive surfaces at least partially overlap.

4. The apparatus of claim 3, wherein faces of said one or more keys are portions of said one or more touch sensitive surfaces.

5. The apparatus of claim 3, wherein said one or more touch sensitive surfaces are made from flexible materials and at least partially covers the said one or more mechanical keys.

6. The apparatus of claim 1, wherein said one or more touch sensitive surfaces are located peripherally to said one or more mechanical keys.

7. The apparatus of claim 1, wherein some of said one or more touch sensitive surfaces are located adjacent a portion of periphery of said one or more mechanical keys.

8. The apparatus of claim 1, wherein the electronic device comprises a pointing device.

9. The apparatus of claim 8, wherein said one or more mechanical keys comprises a rolling wheel.

10. The apparatus of claim 8, wherein said one or more mechanical keys comprises a tracking ball.

11. The apparatus of claim 1, wherein the electronic device is a game pad.

12. The apparatus of claim 1, wherein the electronic device is a cellular phone.

13. The apparatus of claim 1, wherein said one or more mechanical keys are arranged around said one or more touch sensitive surfaces.

14. The apparatus of claim 1, wherein the processor is made to recognize an input operation that is performed by moving followed by pressing.

15. The apparatus of claim 1, wherein the processor is made to recognize an input operation that is performed by pressing followed by moving.

16. The apparatus of claim 1, wherein the processor is adapted to identify (a) the moving as a touch operation feature selected from a group of touch operation features including a start touch location, an end touch location, the direction of the motion, the speed of motion and a path of the motion over the touch sensitive surface, and (b) the pressing as a press operation feature selected from a group of press operation features including key identity, key activation force and key displacement.

17. The apparatus of claim 1, wherein said single user interface function comprises text entry.

18. A method for inputting information into an electronic device using a user interface apparatus, the method comprising:
   providing a user interface apparatus comprising:
   one or more mechanical keys;
   one or more touch sensitive surfaces, said one or more mechanical keys being adjacent to said one or more touch sensitive surfaces; and
   a processor for receiving one or more user input operations performed on said at least one or more mechanical keys and said one or more touch sensitive surfaces to achieve a single user interface function, the input operation comprising a combined operation combining moving over the touch sensitive surface with pressing that comprises activation of at least one mechanical key, in a single stroke, wherein said single user interface function is determined by said processor at the end of said single stroke from a plurality of valid possibilities of said user interface functions, the determination being based on specific features from both said moving and said pressing input operations performed by the user; and
   inputting user input operation by a combined operation combining moving over the touch sensitive surface with pressing that comprises activation of at least one mechanical key, in a single stroke to achieve the single user interface function.

19. The method of claim 18, wherein inputting of the input operation is performed by moving followed by pressing.

20. The method of claim 18, wherein inputting of the input operation is performed by pressing followed by moving.

21. The method of claim 18, wherein the single stroke comprises sliding over said one or more touch sensitive surfaces towards a mechanical key and then pressing the mechanical key.

22. The method of claim 21, wherein the sliding is carried out in more than one direction.

23. The method of claim 18, wherein the moving comprises movement over said one or more touch sensitive surfaces in more than one direction.

24. The method of claim 18, wherein inputting of the input operation comprises sliding over one touch sensitive surface towards one of said one or more mechanical keys, which surround the touch sensitive surface.

25. The method of claim 18, comprising identifying (a) the moving as a touch operation feature selected from a group of touch operation features including a start touch location, an end touch location, the direction of the motion, the speed of motion and a path of the motion over the touch sensitive surface, and (b) the pressing as a press operation feature selected from a group of press operation features including key identity, key activation force and key displacement.

26. The method of claim 18, wherein said user interface function comprises text entry.

* * * * *

UNITED STATES PATENT AND TRADEMARK OFFICE
CERTIFICATE OF CORRECTION

PATENT NO.        : 7,646,378 B2
APPLICATION NO. : 11/216021
DATED             : January 12, 2010
INVENTOR(S)       : David Hirshberg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 872 days.

Signed and Sealed this

Sixteenth Day of November, 2010

David J. Kappos
*Director of the United States Patent and Trademark Office*